Patented May 5, 1936

2,039,391

UNITED STATES PATENT OFFICE 2,039,391

PROCESS FOR PARTIAL DEALKYLATION OF DIALKYL AROMATIC AMINES

Paul W. Carleton, Pennsgrove, and Edwin L. Mattison, Carneys Point, N. J., assignors to E. I. du Pont de Nemours & Company, Wilmington, Del., a corporation of Delaware No Drawing. Application May 11, 1934,
Serial No. 725,192

3 Claims. (Cl. 260—128)

This invention relates to the preparation of aromatic amines. More particularly, this invention deals with the preparation of primary and secondary amines of the benzene or naphthalene series by dealkylation of the corresponding tertiary amines.

In the manufacture of secondary aromatic amines such as, for instance, mono-methyl or mono-ethyl-alpha-naphthylamine or the mono-alkyl derivatives of the various toluidines, it frequently happens that the corresponding tertiary amine, such as dimethyl or diethyl alpha-naphthylamine or the alkyl derivatives of toluidine are produced as by-products. The quantity of these will vary, depending on the process employed. In some cases, as for instance in the case of o-toluidine and α-naphthylamine, these compounds have but little practical utility. Their formation, therefore, constitutes a waste of valuable material.

It is accordingly an object of this invention to provide a process for converting such dialkylarylamines into useful compounds. Another object of this invention is to provide a process for converting dialkylarylamines generally into the corresponding mono-alkyl or primary arylamines. Other and further important objects of this invention will appear as the description proceeds.

We have found that tertiary arylamines may be partially dealkylated by heating with hydrochloric acid at a temperature of about 145 to 210° C. The reaction is apparently a reversible one, and does not go to completion. However, by properly selecting the conditions for the reaction, particularly the temperature, the tertiary amine may be converted to an extent as high as 90% into the corresponding secondary amine admixed with a small fraction of the primary amine. The optimum temperature for dialkyl-α-naphthylamine appears to be in the neighborhood of 175° C.

The hydrochloric acid required for this purpose should preferably be dry. However, it is not necessary to start with gaseous HCl. Instead, an aqueous solution of hydrochloric acid of any desired strength may be employed; since, during the heating, the water is evaporated and the mixture eventually becomes substantially dry.

Without limiting our invention to any particular procedure, the following examples are given to illustrate our preferred mode of operation. Parts given are by weight.

Example I 100 parts of diethyl-alpha-naphthylamine are heated gently with 50 parts of concentrated hydrochloric acid (37.5%) until the water is substantially evaporated. The temperature is then increased slowly until evolution of ethyl chloride is observed. This evolution sets in at about 145° C., and reaches a maximum rate at about 175° C. Heating is continued to a final temperature of 210° C. and the residual oil is boiled with 200 parts of water, with slow addition of alkali until the mass becomes permanently alkaline to brilliant yellow. The oil is then separated, washed, and distilled under reduced pressure. The yield corresponds to 80 parts by weight, and contains 86.5% of mono-ethyl-alpha-naphthylamine, 1.7% of alpha-naphthylamine and 11.8% of diethyl-alpha-naphthylamine.

These constituents may then be separated from each other by treating the oily distillate successively with dilute sulfuric and hydrochloric acids. The sulfate of the primary amine crystallizes out first and is separated. Upon treatment with aqueous hydrochloric acid, the hydrochloride of the secondary amine crystallizes out. The tertiary amine remains in solution, and may be recovered and added to a second batch for further demethylation.

Example II 100 parts of a mixture of naphthylamines consisting of 2.8% of alpha-naphthylamine, 21% of mono-ethyl-alpha-naphthylamine and 76.2% of diethyl-alpha-naphthylamine is treated as described in Example I. On vacuum distillation, 82.6 parts of an oil are obtained which analyzes as follows:

| | Per cent |
|---|---|
| Alpha-naphthylamine | 6.8 |
| Mono-ethyl-alpha-naphthylamine | 84.2 |
| Diethyl-alpha-naphthylamine | 9.0 |

The oil may be separated into its constituents as in Example I.

Example III 125 parts of diethyl-ortho-toluidine are heated with 100 parts of 37% hydrochloric acid solution as described in Example I. The residual oil is boiled with dilute alkali, separated, washed and vacuum distilled as in Example I. The resulting oil (yield=102 parts) analyzes as follows:

| | Per cent |
|---|---|
| Ortho-toluidine | 9.6 |
| Mono-ethyl-ortho-toluidine | 83.1 |
| Diethyl-ortho-toluidine | 7.3 |

*Example IV*

125 parts of diethyl-meta-toluidine are treated as described in Example III, yielding 102.5 parts of distilled oil, which analyzes as follows:

| | Per cent |
|---|---|
| Meta-toluidine | 2.8 |
| Mono-ethyl-meta-toluidine | 61.1 |
| Diethyl-meta-toluidine | 36.1 |

In a similar manner the dialkyl derivatives of aniline, beta-naphthylamine, and various other arylamines may be dealkylated to give a mixture of amines comprised mainly of the corresponding mono alkyl derivatives.

The process is also applicable to dimethyl, dipropyl or other dialkyl derivatives of arylamines, whose corresponding alkyl halide is volatile.

Instead of hydrochloric, hydrobromic acid may be employed.

The amount of acid clearly should for best results be calculated to correspond to about 1 mole per mole of dialkylarylamine. Employment of less than this ratio will result in a correspondingly decreased degree of dealkylation. Use of excess constitutes unnecessary waste. Aside from these two purely economic considerations, however, the process is operable with any desired quantity of acid.

The process may be carried out at normal or subatmospheric pressure.

Many other variations and modifications may be made in our preferred mode of procedure without departing from the spirit of this invention.

We claim:

1. A process for preparing a mono-alkyl-alpha-naphthylamine in which the alkyl group is such that it forms a volatile alkyl halide, which comprises heating the corresponding dialkyl-alpha-naphthylamine with hydrochloric acid at a temperature between 145 and 210° C. until the evolution of alkyl halide has substantially ceased.

2. A process for producing mono-ethyl-alpha-naphthylamine, which comprises heating diethyl-alpha-naphthylamine with concentrated hydrochloric acid to a temperature of about 175° C., and continuing the heating until the evolution of ethyl chloride has substantially ceased.

3. A process which comprises heating substantially 100 parts of diethyl-alpha-naphthylamine with 50 parts of 37% hydrochloric acid until the water has nearly completely evaporated, continuing the heating to a temperature between 145° C. and 210° C. until the evolution of ethyl-chloride has substantially ceased, boiling the oil thus formed with an aqueous alkali to liberate the free base, separating the oily base thus obtained, and subjecting the same to distillation under vacuum whereby to recover an oil comprised chiefly of mono-ethyl-alpha-naphthylamine.

PAUL W. CARLETON.
EDWIN L. MATTISON.